John H. Tims
Boxes &c. for Railroad Cars
Patented 31 Oct. 1839
and Reissued June 13. 1844.

A

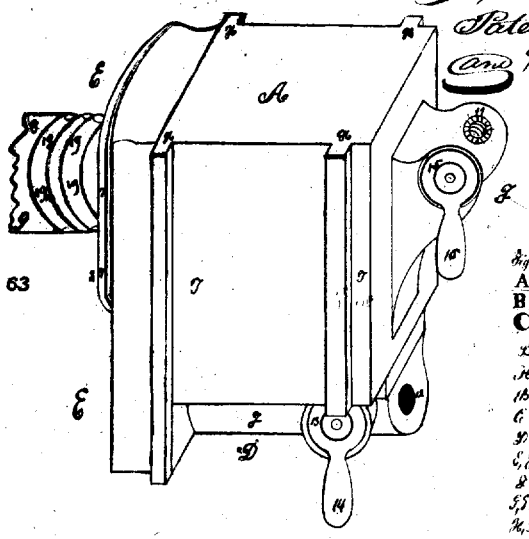

Fig. B

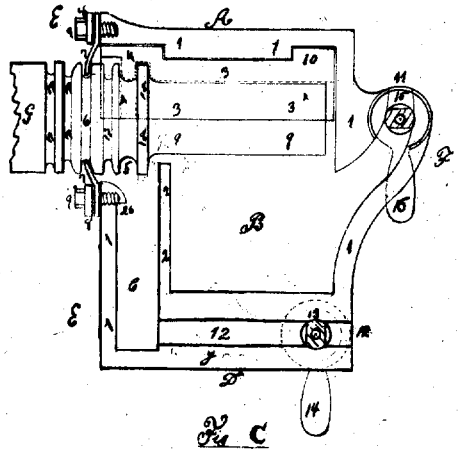

Fig. C

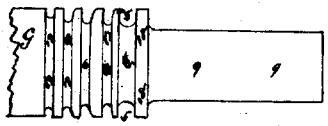

63

Reference to the drawings

Figures — The same characters stand for the same parts

A — Is a Perspective view of the exterior of the box with the parts for fixing back
B — " " Vertical section of the box and journal in a line with the axle
C — " " Longitudinal section of the journal & its axle Letters A is the Top or spring lid of the box
B " " Supply chamber
C " " Saving chamber
D " " Bottom on and inside of the box
E, E " " End of the box next to the hub
F " " Out or front side of the box
G, G " " Axle where it projects out of the box
H, H " " Checks that the sides work in
I, I " " Outside of the box
J " " Outside of the tube that conducts the oil from the saving chamber Numbers 1, 1, 1 Is the outer shell of the box
2, 2 " " Partition that divides the supply and saving chambers
3, 3 " " Strips that bears upon the journal
4 " " Pillet that fills the groove in the axle
5 " " Groove
6 " " Groove that receives the leather cap
7, 7 " " Leather cap
8, 8 " " Flat ring that secures the leather to the box
9, 9 " " Screw bolts that holds the ring and leather cap secure to the box
10 " " Check that holds the strips from slipping endwise
11 " " Aperture or hole for supplying the oil
12 " " Tube for drawing off the oil from the saving chamber
13 " " Faucet for do
14 " " Handle to do
15 " " Faucet for supplying the oil
16 " " Handle to do
17, 17 " " First groove between the pillet and leather cap
18 " " Shoulder and collar of the journal combined
19, 19 " " Grooves between the cap and tube
20 " " Flange that turns to prevent the oil from passing endwise out of the saving chamber and against the leather cap The above is the Drawing of the improved box for receiving, retaining, and keeping the oil or any other lubricating substance clean and free from dust and dirt, and applying the same in a proper manner to the journal, referred to in my specification of the said improvements in said box, dated at the city of Troy on the 11th Day of May A. D. 1844

In testimony whereof I hereto subscribe my name on said Day and year.

In presence of
W. M. Fowler
S. Rowe

John H. Tims

UNITED STATES PATENT OFFICE.

JOHN H. TIMS, OF NEWARK, NEW JERSEY.

IMPROVEMENT IN THE MODE OF CONSTRUCTING THE BEARINGS AND OIL-BOXES FOR THE JOURNALS OF RAILROAD-CARS, LOCOMOTIVES, AND OTHER VEHICLES OR MACHINES.

Specification forming part of Letters Patent No. 1,390, dated October 31, 1839; Reissue No. 63, dated June 13, 1844.

*To all whom it may concern:*

Be it known that I, JOHN H. TIMS, of Newark, in the county of Essex and State of New Jersey, have invented a new, useful, and Improved Method of Constructing the Bearings and Oil-Boxes for Lubricating the Journals of the Axles of Railroad-Cars, Locomotives, &c., which have their bearings on the upper side of their journals; and I do hereby declare that the following is a full, clear, and exact description thereof, reference being had to the accompanying drawings, which form a part of this specification, in which—

Figure A is a perspective drawing, Fig. B a vertical section, and Fig. C a longitudinal section of the journal and axle.

Reference is made on said drawings to the different parts in marginal notes.

When this box is constructed for cars or locomotives having outside bearings, it is formed as represented in the figures above mentioned. For inside bearings the parts must necessarily undergo such modifications as are requisite to adapt the box and its appendages thereto.

A represents the top or spring-bed of the box, and 1 1 1 the outer shell.

3 is a brass or composition step that bears on the journal and fits the upper side of the box inside, on which there is a projecting check, 10, at the outer end that fits into a corresponding recess in the box-top. At the inner end of the step 3 there is a groove cut and a fillet, 4, formed upon the bearing, which fillet enters into a corresponding groove, 5, in the journal, which will aid in sustaining the lateral pressure and in preventing wear from this cause, co-operating with the ordinary collars upon the ends of the axles in effecting this object. The opening in front of the box through which the journal passes I cover by means of a leather cap or washer, 7, which is secured around the opening by a metal ring, 8, held in its place by screws 9. The inner edge of this leather cap is received into a groove, 6, turned in the journal for that purpose, thus retaining the oil within the box and preventing the entrance of dust and dirt from without. Additional grooves, 19 19, are turned next the hub outside the cap, to turn the water and dirt from the box toward the hub. Below the journal the box is made hollow and close to constitute the oil-chamber, and this hollow space is divided into two compartments, C and B, for containing the oil, the division between the two being made by the partition 2 2, extending up from the bottom of the box, but terminating above, as shown in the drawings, in such a manner as that the oil contained in B may flow over into C, as indicated by the arrow. A sponge or other absorbent elastic material—such as cotton waste, &c.—is placed in the compartment B, the compartment C being empty, or without such elastic packing. The elastic material fills the compartment B and bears up against the lower side of the journal G G, which is to be kept lubricated by the oil contained in the sponge, which is supplied through an aperture or tube, 11, formed in a projection on the front end of the box F, said tube being closed by a faucet, 15, the handle 16 of which keeps the faucet closed. 12 is a horizontal tube leading from chamber C to the front under chamber, B. It is stopped with a faucet, 13, acted on by handle 14, similar to the one above named.

When oil is to be supplied for oiling the journals, the faucet 15 is opened and the oil poured in through the tube 11 into the compartment or supply-chamber B. When the sponge or other material is saturated and compartment B filled, the oil will run over the partition 2 2 into compartment C, as indicated by the arrow. This may be known by opening faucet 13, at which the oil will run out. After it begins to run over the supply-chamber should then be closed. After the oil from the other or receiving-chamber is all drawn off, the lower faucet, 12, is also closed and kept so by the gravity of the handle 14. On the side of the box E next the hub there is a projection, 20, inward, just under the hole where the journal goes through, so formed that the oil contained in the saving-chamber C shall not, when agitated by the motion of the car, splash over toward the hub, but be thrown back again into the compartment.

The difference in the characteristic features of my oil-box and bearings for journals and those which have been heretofore employed will be manifest to every competent machinist. They are, first, the applying the oil to the under side of the journal without first passing over the upper side of the journal through a hole in the step or bearing, thereby obviating all the difficulties arising from the filling up of said apertures, which they almost uniformly do shortly after having been put in order. By my improvement the oil is applied to the lower side of the journal, and there are not any conduits through which the oil is to flow that are liable to be stopped up or accidentally obstructed so as to prevent a regular supply of oil at all times without waste, this being effected by means of the saving-chamber C. All dust and dirt are kept out of the box by means of the cap 7 and grooves 6.

It will be evident that the form of the respective parts will admit of considerable variation, while the general operation and principle of action may remain unchanged. I do not, therefore, by the foregoing specification intend to limit myself to the precise form and arrangement which I have described and exhibited; but I design to vary them as I may think proper while the same ends are obtained by analogous means.

Having thus fully described my improvements, I wish it to be fully understood that I do not claim as my invention the supplying of oil to the journals of axles by means of sponge or other similar substance, as that has before been done; nor do I claim the invention of a cup or saving-chamber placed under the bearing of a journal, as cups open and exposed to the dirt and from which the oil could be spilled by the jar of the car in motion have been used. Neither do I claim a washer nor cap from the hub of a wheel, as that is now applied to common carriages; but

What I do claim as my invention, and for which I desire Letters Patent, is—

1. Constructing the box in the manner described, having two recesses or compartments in its lower section, into one of which, B, sponge or other suitable elastic substance is fitted so as when saturated with oil to lubricate the journal with which it comes in contact, the other chamber, C, being made to receive the oil that flows over from compartment B, the oil being conveyed to said chambers through a conductor that enters the supply-chamber B under the journal, the whole being combined substantially as herein set forth.

2. The particular manner in which I have constructed the journal and its bearings, grooves, and cap in combination with the foregoing lubricating apparatus, consisting in the fillet [illegible]ongue, and the recess in the bearings for checking the lateral motion of the bearing, and the grooves and washer for retaining the oil, in combination, as set forth.

JOHN H. TIMS.

Witnesses:

J. J. GREENOUGH,

LAFAYETTE CALDWELL.